(12) United States Patent
Kundermann

(10) Patent No.: US 6,364,777 B1
(45) Date of Patent: Apr. 2, 2002

(54) TORQUE-TRANSMITTING CONNECTING ARRANGEMENT

(75) Inventor: Wolfgang Kundermann, Schweinfurt (DE)

(73) Assignee: Mannesmann Sachs AG, Schweinfurt (DE)

(*) Notice: Subject to any disclaimer, the term of this patent is extended or adjusted under 35 U.S.C. 154(b) by 0 days.

(21) Appl. No.: 09/586,107

(22) Filed: Jun. 2, 2000

(30) Foreign Application Priority Data

Jun. 7, 1999 (DE) .......................................... 199 25 913

(51) Int. Cl.$^7$ ................................................. F16D 3/79
(52) U.S. Cl. .......................................................... 464/98
(58) Field of Search ................... 464/98, 157; 403/335, 403/336, 353, 354; 60/330; 192/3.29

(56) References Cited

U.S. PATENT DOCUMENTS

| | | | | |
|---|---|---|---|---|
| 1,200,143 A | * | 10/1916 | Sschrade | ................ 403/335 X |
| 1,263,252 A | * | 4/1918 | Jencick | ................... 464/157 X |
| 4,068,749 A | * | 1/1978 | Antrim | ...................... 464/98 X |
| 4,502,279 A | * | 3/1985 | Fuehrer | ................. 74/606 R X |
| 4,997,408 A | * | 3/1991 | Copeland | ................. 464/157 X |
| 5,234,278 A | * | 8/1993 | Hall, III et al. | .......... 403/326 X |
| 5,342,242 A | * | 8/1994 | Ladd et al. | ..................... 464/98 |

FOREIGN PATENT DOCUMENTS

DE  32 22 119  10/1983

* cited by examiner

Primary Examiner—Lynne H. Browne
Assistant Examiner—Greg Binda
(74) Attorney, Agent, or Firm—Cohen, Pontani, Lieberman & Pavane

(57) ABSTRACT

A connecting arrangement for connecting an input drive shaft such as a crank shaft to a coupling device such as a torque converter includes a transmission element having a plate-like design and including an annular body and a plurality of radially extending arms. A first engagement formation is arranged on at least some of the radially extending arms. A second engagement formation is arranged on an engagement element arranged on the coupling device. The first and second engagement formations are brought into engagement/retention arrangement maintains the torque transmitting connection by maintaining the axial positions of the transmission element and engagement element.

12 Claims, 5 Drawing Sheets

TORQUE-TRANSMITTING CONNECTING ARRANGEMENT

BACKGROUND OF THE INVENTION

1. Field of the Invention

The present invention relates to a connecting arrangement for establishing a torque-transmitting connection between an input drive such as a crankshaft and a hydrodynamic coupling device.

2. Description of the Related Art

A connecting arrangement for connecting a torque converter to an input drive shaft is disclosed in German reference DE 32 22 119 C1 in which a radially inner area of a flexible transmission plate is screwed to the input drive shaft and a radially outer area of the flexible transmission plate is screwed to the housing of the torque converter or to fastening portions provided thereon. The flexible transmission plate is used to establish a torque-transmitting connection between the input drive shaft and the torque converter and to ensure that slight inaccuracies in the positioning of the input drive shaft relative to a gearbox input shaft during rotational operation are compensated for by virtue of the flexibility of this plate.

Flexible transmission plates of this kind are typically fixed to the input drive shaft and the torque converter by axial screwing to establish torque transmission which is in principle capable of meeting the torque transmission requirements which arise in operation. A problem with this connection arrangement is that as motor vehicle designs are becoming more and more dense, access to the screws provided for fastening the flexible transmission plates is becoming more and more limited. This limited access increases the difficulty in connecting the flexible plates and therefore increases assembly complexity and cost.

SUMMARY OF THE INVENTION

It is the object of the present invention to provide a connecting arrangement for connecting a coupling device such as a hydrodynamic torque converter to an input drive so that it is possible to compensate for misalignments of various component of a motor vehicle drive system during torque transmission. It is a further object of the present invention to provide a connecting arrangement that is simple to construct and a connection which is simple to establish.

According to the invention, this object is achieved by a connecting arrangement for establishing a torque-transmitting connection between an input drive and a coupling device, the connecting arrangement comprising a transmission element which is connectable to the input drive. A first engagement formation is arranged on the transmission element which is in a torque-transmitting engagement with a second engagement formation which is attached to the coupling device. An engagement/retention arrangement is operatively connected to act between the transmission element and the coupling device for holding the first and the second engagement formation in torque-transmitting engagement once torque-transmitting engagement has been established between the first and the second engagement formation.

The connecting arrangement according to the present invention comprises a flexible design and is not attached to the coupling device by introducing bolts or the like. Instead, the connection is produced by interengaging first and second engagement formations which fundamentally assume the torque transmission function. These first and second engagement formations provide coupling in terms of force, preferably form-fitting coupling, about the axis of rotation of the system in the circumferential direction. The engagement/retention arrangement ensures that the coupling state is maintained while torques are transmitted during operation by preventing these first and second engagement formations from decoupling. It should be pointed out that where reference is made in the present text to the fact that the engagement/ retention arrangement acts between two components, this does not mean that the engagement/retention arrangement has to engage directly on these two components. For example, it is possible for there to be intermediate members which ultimately provide the connection between the engagement/retention arrangement and the components discussed.

In a preferred embodiment, the transmission element may comprise a plate-type design, wherein a radially inner area of the transmission element is designed for connection to the input drive. In this embodiment, the first engagement formation is arranged radially to the outside of the connection to the input drive.

A coupling which is very reliable and is suitable for transmitting high torques may be obtained if the first engagement formation comprises a first toothing formation and the second engagement formation comprises a complementary second toothing formation.

To simultaneously provide the function of centering the coupling device relative to the input drive by the first and second toothing formations for establishing torque coupling, it is proposed that the first and the second toothing formation each form an axial toothing, preferably in the form of a Hirth toothing. The first and second toothing formations are arranged such that as the two toothing formations are brought into engagement, the input drive and the coupling device are forcibly aligned.

To achieve the required flexibility of the connecting arrangement, the transmission element comprises a plurality of transmission arms which extend radially outwards. At least part of the first engagement formation is provided on at least some of the transmission arms.

To maintain torque-transmitting engagement between the first and the second engagement formations once established, it is proposed that the engagement/retention arrangement comprises a retention element arranged on the coupling device such that it is rotatable about an axis of rotation. The retention element is supported in the axial direction and has a third engagement formation. The transmission element has a retention area with a fourth engagement formation, which may be brought into or out of retaining engagement with the third engagement formation by rotating the retention element about the axis of rotation.

The third and the fourth engagement formations may, for example, be made of a thread-type design. All that occurs then is that the retention element is brought into engagement with the retention area of the transmission element by rotation about the axis of rotation in the manner of a screw or a nut, thereby producing an engagement which acts in a form-fitting manner in the axial direction and essentially prevents or limits the axial movement of the transmission element. The result of the engagement of the retention element and the retention area is that the first engagement formation is forcibly held in torque-transmitting engagement with the second engagement formation.

For example, the retention element may comprise a sleeve-type design with a thread configuration on its circumferential surface as a third engagement formation. To provide axial support for the retention element, a retaining-projection area is arranged on the retention element. The retaining-projection area is supported axially against a counterretaining-projection area attached to the coupling device or another component.

Once the torque-transmitting state has been established, it is advantageous to ensure that the coupling state is not canceled by unwanted release of the retention element. Therefore, the retention element may be locked against rotation about the axis of rotation. An arrangement for locking the retention element against rotation may, for example, comprise separate locking elements. However, the arrangement for locking the retention element may also comprise a design of the third and fourth engagement formations as a thread acting in a self-locking manner.

To provide the configuration which maintains the torque-coupling state, an essentially axially extending area may be provided on the transmission element with the fourth engagement formation on a circumferential surface of the axially extending area. In a preferred embodiment, the essentially axially extending retention portion, on which at least part of the fourth engagement formation is provided, may be arranged on the radially outer area of at least some of the transmission arms.

The connecting arrangement according to the invention may be produced in a simple and very economical manner if the transmission element comprises a formed sheet-metal part. In this case, the material properties of sheet-metal parts simultaneously ensure the required or desired flexibility of the transmission element.

The present invention furthermore relates to the combination of a coupling device, in particular a hydrodynamic coupling device, with a connecting arrangement according to the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like references denote similar elements throughout the several views.

DETAILED DESCRIPTION OF THE PRESENTLY PREFERRED EMBODIMENTS

A first embodiment of a connecting arrangement 10 according to the present invention is shown in FIGS. 1–4.

Figure 1:
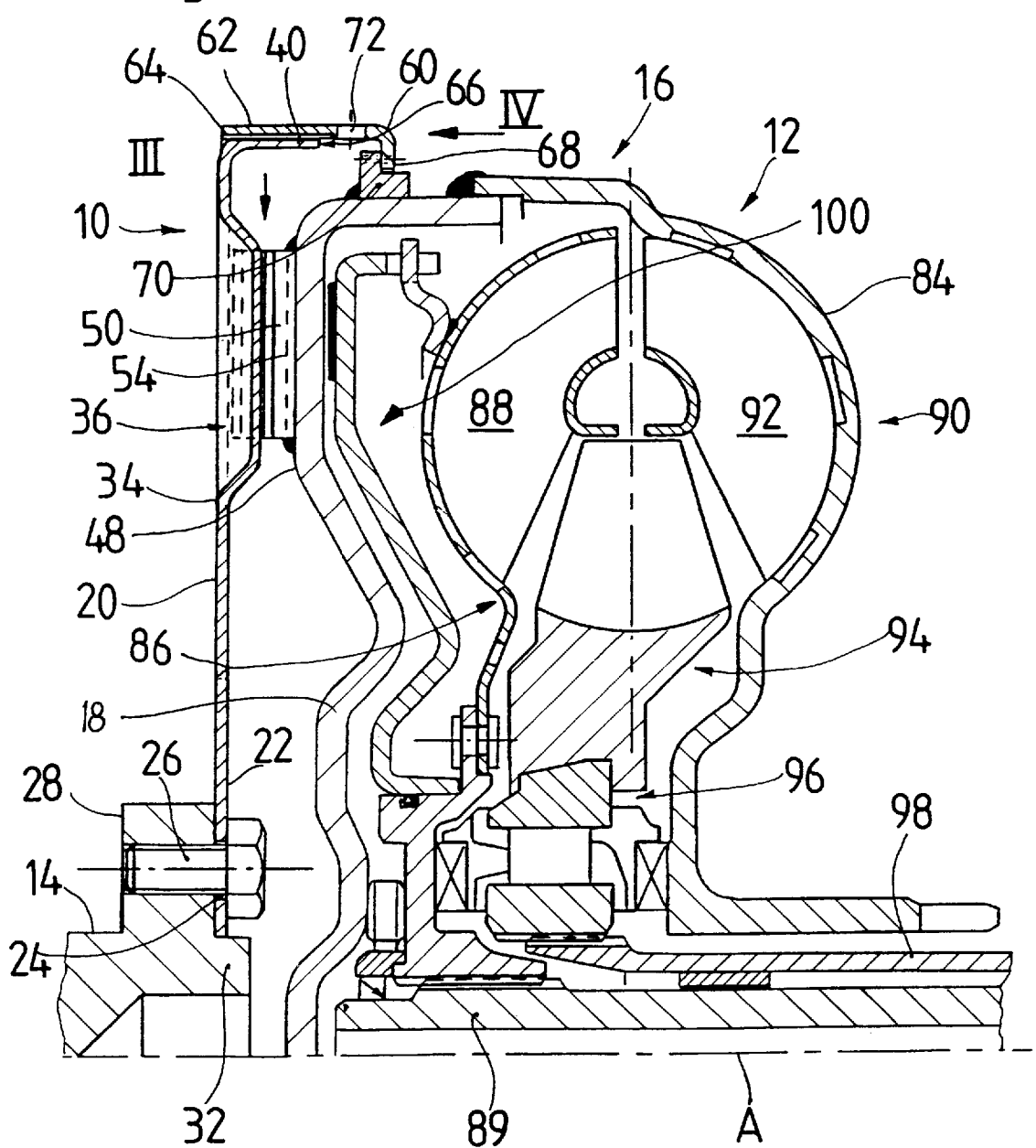
FIG. 1 is a partial longitudinal sectional view of a torque converter coupled to an input drive shaft by a connecting arrangement according to an embodiment of the present invention.

The connecting arrangement 10 is a torque-transmitting connection between a hydrodynamic coupling device 12 and an input drive shaft 14. In the embodiment of FIG. 1, the hydrodynamic coupling device 12 comprises a torque converter and the input driving shaft 14 comprises a crankshaft. The hydrodynamic coupling device will be referred to hereafter as the torque converter 12. As shown in FIG. 1, the connecting arrangement 10 forms a torque-transmitting connection between a housing cover 18 and the input drive shaft 14. The housing cover 18 comprises a part of a housing 16 of the torque converter 12.

The connecting arrangement 10 comprises a transmission element which is a flexible plate 20. The radially inner area of the flexible plate 20 has an annular body 22 with a plurality of passage openings 24 arranged therethrough. Threaded fasteners such as fastening bolts or fastening screws 26 may be passed through the passage openings 24 and threaded into a shaft flange 28 of the input drive shaft 14. The central area of the annular body 22 of the flexible plate 20 has an opening 30 of larger diameter than the passage openings 24 which rests on a centering projection or shoulder 32 on the input drive shaft 14 and thus allows the flexible plate 20 to be positioned relatively accurately in relation to the input drive shaft 14.

Figure 2:
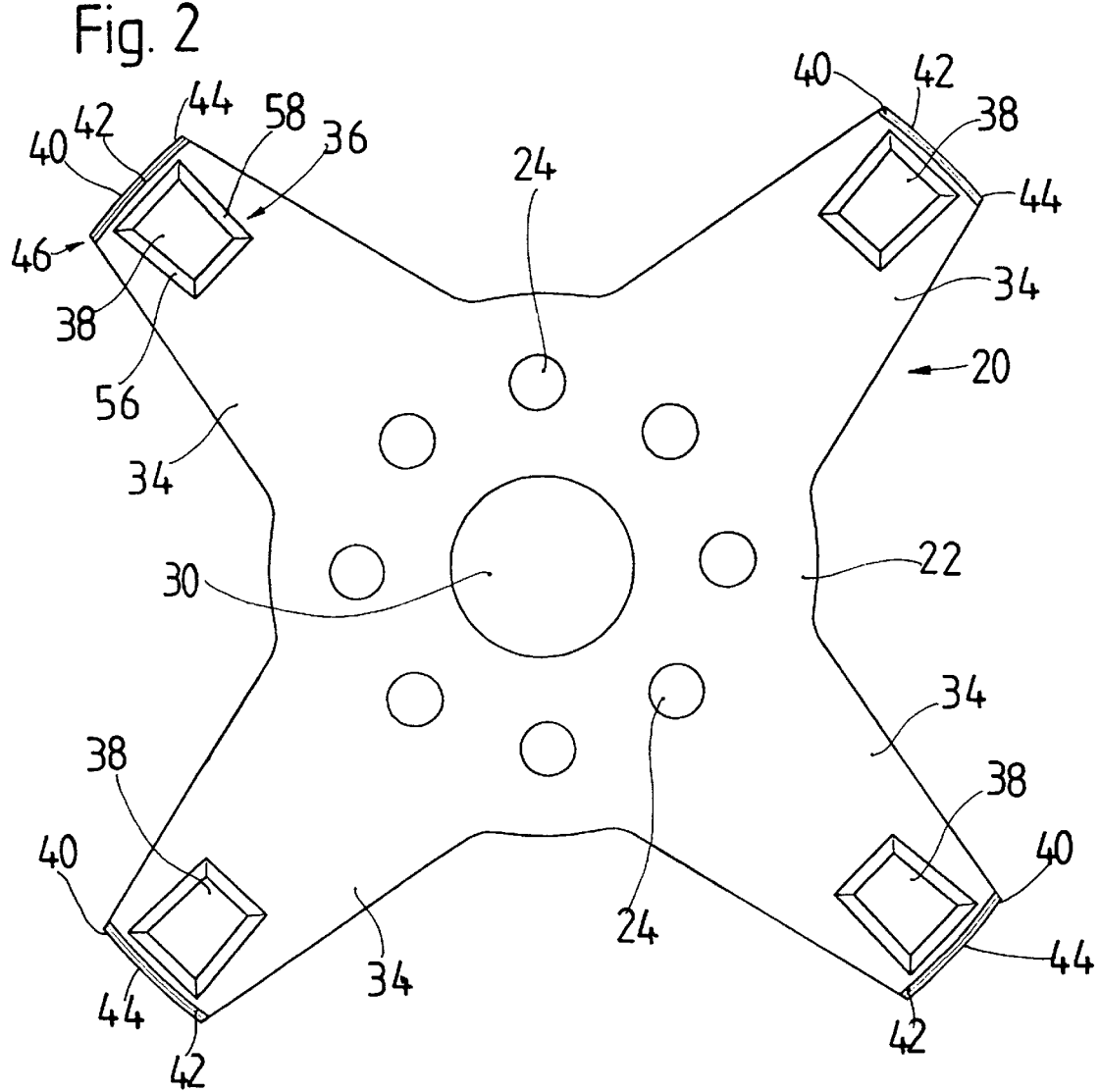
FIG. 2 is an axial view of a flexible plate provided in the connecting arrangement in the embodiment of the present invention shown in FIG. 1.

The flexible plate 20 has a plurality of arms 34 adjoining the annular body 22 which extend radially outward. As illustrated in FIG. 2, the arms 34 are preferably arranged at the same circumferential spacing of 90° relative to one another. A radially outer area of each of these arms 34 bears an axial or tooth-like projection 38 which comprises one part of a first engagement formation 36. Together, the tooth-like projections 38 on all the arms 34 form the first engagement formation 36 in the form of axial toothing, i.e. teeth which extend axially from a main body of the flexible plate 20. Each of the arms further comprise an axially projecting portion 40 in an area radially to the outside of the tooth-like projection 38 (see FIG. 1). An outer circumferential surface 42 of each of the axially projecting portions 40 comprises a thread configuration 44. Together, the threaded configurations 44 of the arms 34 (four of which are shown in the embodiment of FIG. 1) comprise a fourth engagement formation 46 of thread-like design, the function of which will be described below.

The flexible plate 20 shown in FIGS. 1 and 2 is preferably punched out of sheet steel and then worked in a forming operation for forming the toothing-like projections 38 and the axially projecting portions 40, e.g. by pressing and rolling. This construction makes the flexible plate 20 very economical to produce. Furthermore, by virtue of its configuration with a plurality of arms 34 in particular, the flexible plate 20 has a relatively high flexibility combined with a high torque transmitting capacity.

Figure 3:
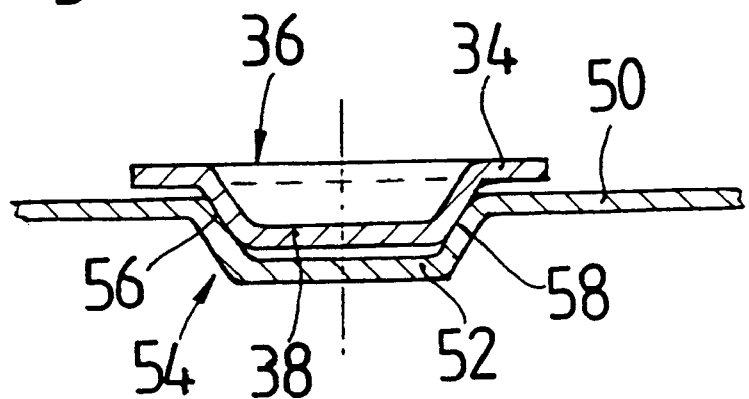
FIG. 3 is a view in a radial direction along arrow III in FIG. 1.

An engagement element 50 in the form of a ring is fixed on one axial side 48 of the housing cover 18, e.g. by welding. In the view from the radial outside of the inventive arrangement, which can be seen in FIG. 3, the annular engagement element 50 exhibits an undulating shape with a plurality of axial depressions 52. In particular, the annular engagement element 50 has a depression for each tooth-like projection 38 arranged on an arm 34 of the flexible plate 20. The depressions 52 on the engagement element 50 together form a second toothing-like engagement formation 54 which, as can be seen in FIG. 1 and FIG. 3, may be brought into torque-transmitting engagement with the first engagement formation 36 on the flexible plate 20. If the flexible plate 20 is fixed on the input drive shaft 14 and the torque converter 12 is brought axially, i.e. in the direction of the axis of rotation A, up to the input drive shaft 14, then, given appropriate circumferential positioning, the projections 38 enter the depressions 52 for forming a torque-transmitting engagement between the flexible plate 20 and the housing 16 of the torque converter 12.

The annular engagement element 50 is also preferably formed by punching and forming a sheet-metal part. It should be pointed out that it is not necessary for the annular engagement element 50 to be a ring element. The annular engagement element 50 may alternatively comprise individual elements for forming the depressed areas or axial raised areas between the latter that are attached to the converter housing 16. However, the use of a ring element is preferred for simplicity of construction.

As shown in FIG. 2, the toothing-like projections 38 which together form the first engagement formation 36 are each designed so that their circumferential extent decreases from the radial outside to the radial inside. The depressions 52 are designed in a corresponding manner. The toothing configuration formed by the depressions 52 and projections 38 is thus of the Hirth type, in which the teeth have an increasing circumferential width from the radial inside to the radial outside. The Hirth type toothing configuration of the first and the second engagement formations 36, 54 produces a self-centering effect during engagement of the first and second engagement formations 36,54. Accordingly, the configuration of the first and second engagement formations 36, 54 having the shape discussed provides appropriate centering of the torque converter 12 relative to the input drive shaft 14. The use of further centering elements, which then hold the torque converter 12 in a suitable position relative to the input drive shaft 14 during assembly, is not required and, in particular, is to some extent also not desired because the further centering elements would introduce over definition by double centering.

FIGS. 2 and 3 show that the circumferential sides of the tooth-like projections 38 and likewise also the depressions 52 have respective flank portions 56, 58 which face in the circumferential direction and rest against one another during torque transmission. The flank portions 56, 58 do not extend directly in the axial direction but slope relative to the axial direction, with the result that the top of the tooth-like projection 38 has a smaller circumferential extent than the bottom of the of the tooth-like projections 38. Similarly, the bottom or closed end of the depression 52 has a smaller circumferential extent than the top or open end of the depression 52. This allows the two engagement formations 36, 54 to be inserted into one another more easily and in particular also ensures that, once engagement has been established, it is free from play.

However, the oblique flanks 56, 58 give rise to an axial force during torque transmission due to the movement which takes place in the circumferential direction, and this axial force means that the first and second engagement formations 36, 54 have a tendency to move out of engagement, i.e., the rotation of the first engagement formation causes a force at the oblique flanks 36, 68 which urges the tooth-like projection 38 out of the depression 52. To avoid this, the connecting arrangement 10 according to the invention has a retention ring 60 (see FIG. 1). The retention ring 60 has an essentially cylindrical sleeve portion 62 with a thread formation 64 on its inner circumferential surface as a third engagement formation 66. The fourth engagement formation 46 comprising the threaded configuration 44 on the axial projecting portions 40 may be brought into threaded engagement with the third engagement formation 66. The retention ring 60 furthermore has a contact portion 68 which projects radially inward and takes the form of an all-round ring portion to form a retaining-projection region. Alternatively, the contact portion may comprise individual projections which are bent down to form the retaining-projection region. This contact portion 68 axially abuts a contact element 70 fixed on the outer circumference of the housing cover 18. The contact element 70 acts as a counter-retaining projection region.

Once the torque converter 12 is arranged relative to the flexible plate 20 so that the first and second engagement formations 36, 54 have been brought into their torque-transmitting engagement, the retention ring 60 is rotated about the axis of rotation A such that it is screwed by means of the thread formation 64 onto the external thread formed on the flexible plate 20 by the individual threaded portions 44 until its contact portion 68 strikes against the contact element 70. Tightening may be performed with a force such that the first engagement formation 36 is pressed into the second engagement formation 54. In principle, the third engagement formation 66 and the fourth engagement formation 46 may be engaged even before the first and the second engagement formations 36, 54 are brought into torque-transmitting engagement. This bringing into torque engagement then takes place forcibly when the retention ring 60 is rotated since the torque converter 12 with the second engagement formation 54 fixed on it is thereby pulled axially against the flexible plate 20 with the first engagement formation 36 provided thereon.

Figure 4:
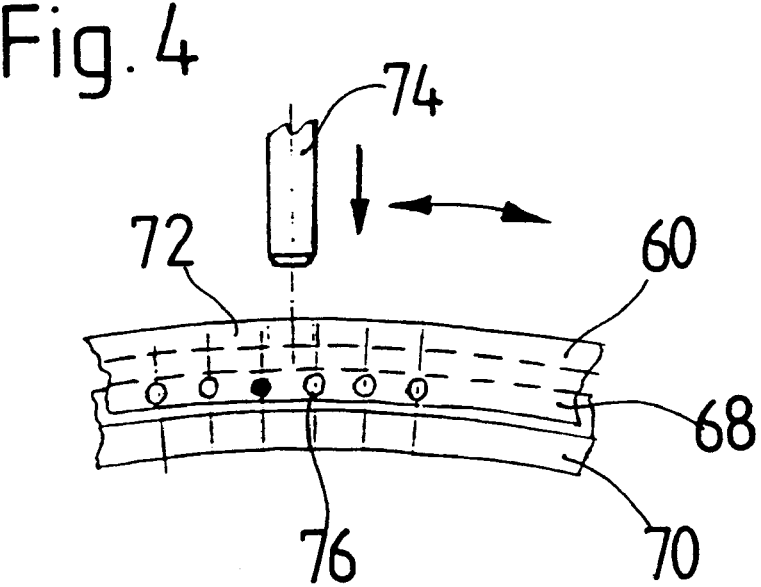
FIG. 4 is an axial view along arrow IV in FIG. 1.

To rotate the retention ring 60, the latter may comprise one or more openings 72 on its cylindrical sleeve portion 62. As illustrated in FIG. 4, a tool 74 may be introduced into the openings 72 to rotate the retention ring 60.

Various securing measures may be taken to prevent the retention ring 60 from being rotated and the retaining engagement being loosened if shocks or vibration occur once retaining engagement has been established between the third engagement formation 66 and the fourth engagement 46. In a preferred embodiment, the two threads 44, 64 are designed as self-locking threads, i.e. threads with a relatively small thread pitch. As an alternative or in addition, it is possible to provide a plurality of circumferentially successive through openings or holes 76 in the contact portion 68 and in the contact element 70. If a hole 76 in the retention ring 60 is then in alignment with a corresponding hole 72 in the contact element 70 in a particular rotational position of the retention ring 60, a locating pin may be inserted into these two aligned holes. The locating pin may be held in the holes 72, 76 by a clamp fit and thus forcibly prevent rotation of the retention ring 60. To release the retaining engagement, this locating pin may be pushed out of the openings by a tool, allowing the retention ring 60 to be rotated again. It is, for example, possible here to provide a multiplicity of circumferentially successive openings on either the retention ring 60 or the contact element 70 and to provide just a small number of openings on the other of these two elements. It is furthermore also possible to provide a relatively large number of circumferentially successive openings on both elements, it being possible for the circumferential spacing of the openings provided in the different elements to differ, or for the circumferential spacing of the openings provided in one of the elements to vary in order to allow the retention ring 60 to be fixed in virtually any rotational position on the contact element 70.

It should be pointed out that, when the contact portion 68 comprises an annular configuration, the contact element 70 may, of course, be formed by a plurality of separate segments distributed in the circumferential direction. It should furthermore be pointed out that the first and the second engagement formations 36, 54 do not necessarily have to be designed with a shape which provides a self-centering function. Centering may also likewise be performed by means of a guide stud. It should furthermore be pointed out that the engagement element 50 may also be machined from a solid part or, as already discussed, individual segments, which then form the depressions 52 between them, can be fixed on the housing cover 18. Finally, it is also possible to replace the tooth-like projections 38 in the arms 34 of the plate 20 with depressions, into which tooth-like projections on the engagement element 50 then engage. It is also possible for a plurality of circumferentially successive tooth-like projections or corresponding depressions to be formed on each of the individual arms 34 to provide respective segments of the first engagement formation.

Figure 5:
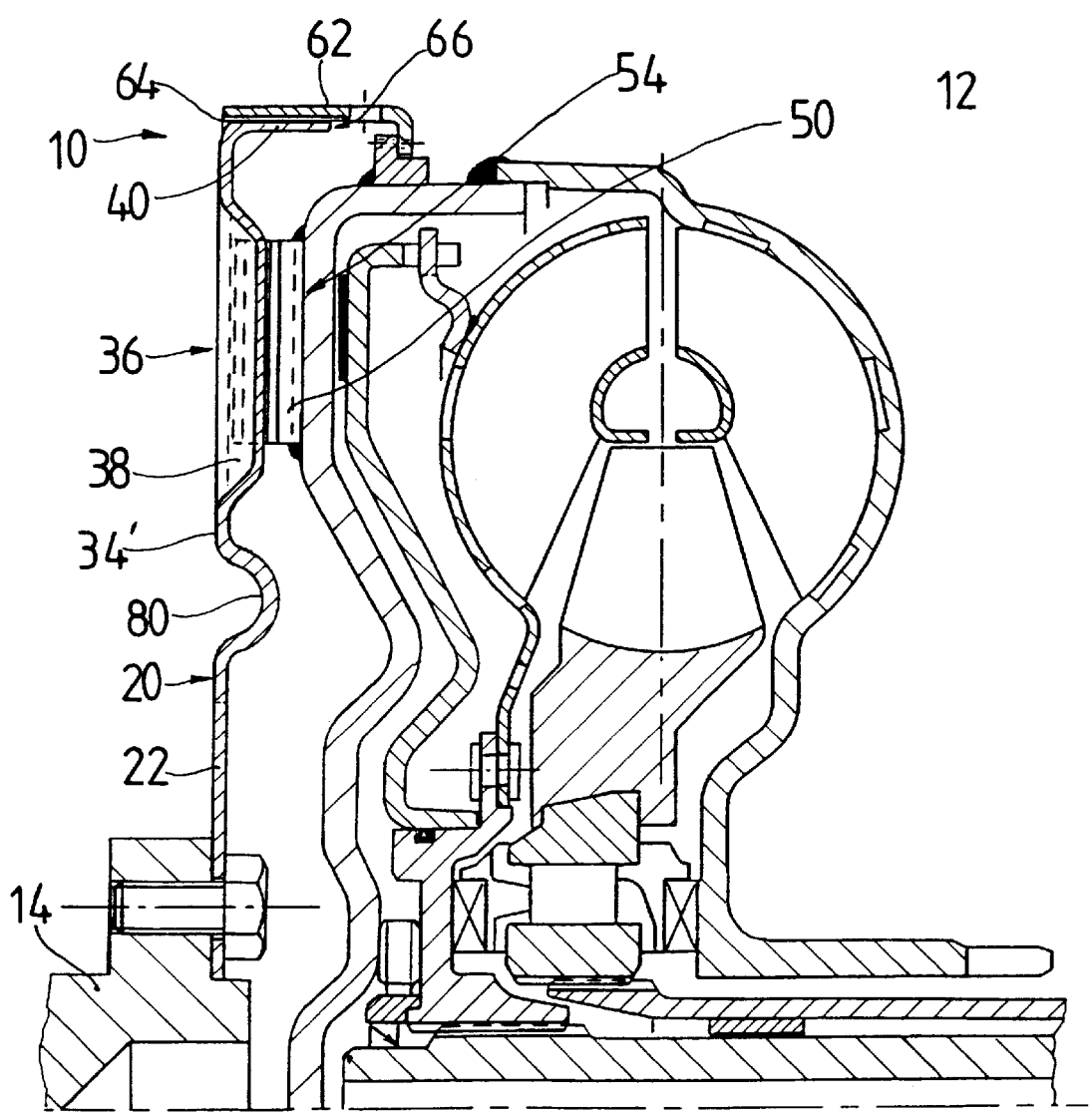
FIG. 5 is a partial longitudinal sectional view of a connecting arrangement according to another embodiment of the present invention.
Figure 6:
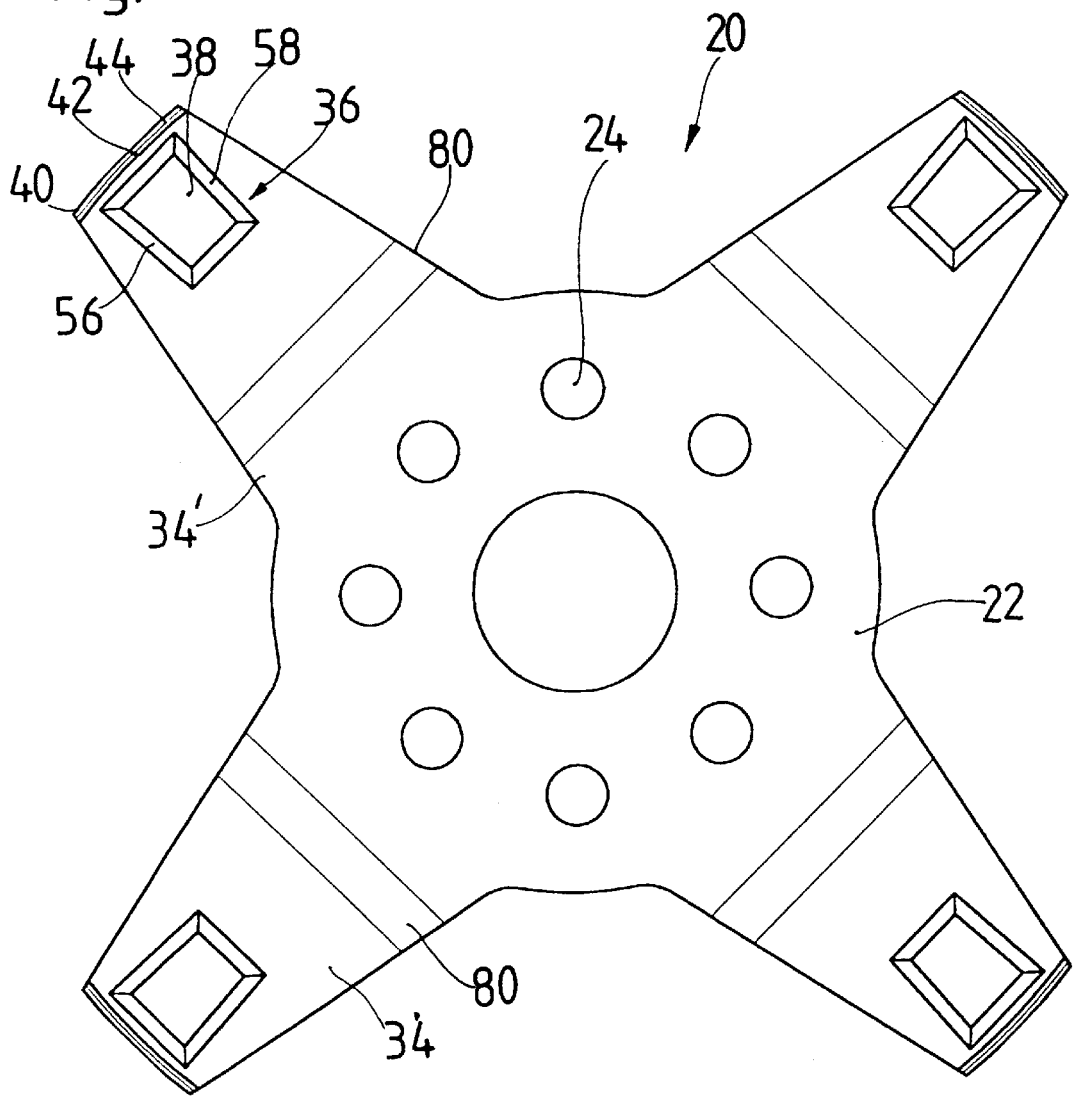
FIG. 6 is an axial view of the flexible plate illustrated in FIG. 5.

FIGS. 5 and 6 show an alternative embodiment of the connecting arrangement 10 according to the invention. Components which correspond in terms of construction or functioning to components described above are denoted by the same reference numerals. It will be apparent here that a bulge or bead 80 formed in the axial direction is provided in the flexible plate 20, in particular in the area of the arms 34' of the latter. This bulge gives the individual arms 34' increased elasticity in the radial direction, thereby making it possible to compensate for pitch errors and/or misalignment between a gearbox input shaft and the input shaft 14. However, the stiffness of the arms 34', which are thus radially elastic, must be designed such that vibrational excitation is avoided given the forces which occur during operation. Otherwise, the construction illustrated in FIGS. 5 and 6 corresponds as regards structural configuration and functioning to the construction described above with reference to FIGS. 1–4.

With respect to the construction of the torque converter 12 that can be seen in FIGS. 1 and 5, it should merely be stated that the torque converter may, in principle, comprise any desired construction. In the embodiment illustrated, it has a two-part housing 16 comprising the housing cover 18 and a pump-impeller shell 84. A turbine wheel 86 is rotatably arranged within the converter 12 and is connected in a rotationally fixed manner to an output drive shaft 88. The turbine wheel 86 bears a plurality of turbine-wheel blades 88 which lie axially opposite pump-impeller blades 92 arranged on a pump impeller wheel 90. A stator wheel 94 is arranged between the turbine wheel 86 and the pump impeller 90. The stator wheel 94 is mounted on a support shaft 98 via a freewheel 96 so that the stator wheel 94 is freely rotatable in one direction of rotation. The torque converter 12 furthermore has a lock-up clutch 100, which is operable for establishing a rotationally firm connection between the turbine wheel 86 and the converter housing 16 in a manner known per se. Although the torque converter 12 is shown, it is self-evident that the connecting arrangement 10 according to the present invention may be used in conjunction with an extremely wide variety of torque converters or coupling devices, e.g., hydraulic or fluid couplings. The essential advantage of the connecting arrangement 10 according to the invention is that it need only be connected via a threaded connector to the input drive shaft 14 to establish the torque-transmitting connection. The torque-transmitting connection to the converter or to the coupling device is established by the form-fitting engagement of toothing configurations.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A connecting arrangement for establishing a torque-transmitting connection between an input drive and a coupling device of a motor vehicle drive train, comprising:

a transmission element rotatable about an axis of rotation and having means for connecting said transmission element to the input drive via threaded connectors;

a first engagement formation including a first toothing formation arranged on said transmission element;

an engagement element having a second engagement formation including a second toothing formation, wherein said first and second toothing formations comprise axially projecting toothing formations relative to said axis of rotation and said first engagement formation and said second engagement formation are engagable for forming a torque transmitting connection between said transmission element and said engagement element via said first and second toothing formations, and wherein at least one of said first and second toothing formations comprises a tooth having an increasing circumferential width from a radially inner side to a radially outer side of said tooth; and an engagement/retention arrangement operatively arranged for maintaining the torque-transmitting connection between said transmission element and said engagement element.

2. The connecting arrangement of claim 1, wherein said transmission element comprises a plate-type design, said means for connecting to the input drive are arranged in a radially inner area of said transmission element, and said first engagement formation is arranged radially outside of said means for connecting.

3. The connecting arrangement of claim 1, wherein said engagement/retention arrangement comprises a retention element operatively arranged so that said retention element is rotatable about an axis of rotation (A) relative to said transmission element and axially supported relative to said engagement element, said engagement/retention arrangement further comprising a third engagement formation; and said transmission element further comprises a retention area with a fourth engagement formation, said third engagement formation engagable with said fourth formation via a rotation of said retention element about the axis of rotation.

4. The connecting arrangement of claim 3, further comprising means for selectively securing said retention element against rotation about the axis of rotation.

5. The connecting arrangement of claim 3, wherein said retention area comprises an essentially axially extending area having a circumferential surface, said fourth engagement formation being arranged on said transmission element.

6. The connecting arrangement of claim 5, wherein said transmission element comprises a plurality of transmission arms which extend radially outwards from said transmission element, and wherein at least a portion of said first engagement formation is arranged on at least some of said transmission arms, and wherein said retention area comprises an essentially axially extending retention portion on which at least part of said fourth engagement formation is arranged, said axially extending retention portion being arranged on a radially outer area of at least some of said plural transmission arms.

7. The connecting arrangement of claim 1, wherein said transmission element comprises a formed sheet-metal part.

8. A connecting arrangement for establishing a torque-transmitting connection between an input drive and a coupling device of a motor vehicle drive train, comprising:

a transmission element having means for connecting said transmission element to the input drive via threaded connectors;

a first engagement formation arranged on said transmission element;

an engagement element having a second engagement formation, wherein said first engagement formation and said second engagement formation are engagable for forming a torque transmitting connection between said transmission element and said engagement element; and an engagement/retention arrangement operatively arranged for maintaining the torque-transmitting connection between said first transmission element and said engagement element, wherein said engagement/retention arrangement comprises a retention element operatively arranged so that said retention element is rotatable about an axis of rotation (A) relative to said transmission element and axially supported relative to said engagement element, said engagement/retention arrangement further comprising a third engagement formation and said transmission element further comprises a retention area with a fourth engagement formation, wherein said third and fourth engagement formations comprise threaded designs such that said third engagement formation engagable with said fourth formation via a rotation of said retention element about the axis of rotation.

9. A connecting arrangement for establishing a torque-transmitting connection between an input drive and a coupling device of a motor vehicle drive train, comprising:

a transmission element having means for connecting said transmission element to the input drive via threaded connectors;

a first engagement formation arranged on said transmission element;

an engagement element having a second engagement formation, wherein said first engagement formation and said second engagement formation are engagable for forming a torque transmitting connection between said transmission element and said engagement element; and an engagement/retention arrangement operatively arranged for maintaining the torque-transmitting connection between said transmission element and said engagement element, wherein said engagement/retention arrangement comprises a retention element operatively arranged so that said retention element is rotatable about an axis of rotation (A) relative to said transmission element and axially supported relative to said engagement element, said engagement/retention arrangement further comprising a third engagement formation and said transmission element further comprises a retention area with a fourth engagement formation, wherein said retention element comprises a sleeve-type design having a circumferential surface, wherein said third engagement formation comprises a thread configuration on the circumferential surface, and said third engagement formation engagable with said fourth formation via a rotation of said retention element about the axis of rotation.

10. A connecting arrangement for establishing a torque-transmitting connection between an input drive and a coupling device of a motor vehicle drive train, comprising:

a transmission element rotatable about an axis of rotation and having means for connecting said transmission element to the input drive via threaded connectors;

a first engagement formation including a first toothing formation arranged on said transmission element;

an engagement element having a second engagement formation including a second toothing formation, wherein said first and second toothing formations comprise axially projecting toothing formations relative to said axis of rotation and said first engagement formation and said second engagement formation are engagable for forming a torque transmitting connection between said transmission element and said engagement element via said first and second toothing formations; and an engagement/retention arrangement operatively arranged for maintaining the torque-transmitting connection between said transmission element and said engagement element, wherein said engagement/retention arrangement comprises a retention element operatively arranged so that said retention element is rotatable about an axis of rotation (A) relative to said transmission element and axially supported relative to said engagement element, said engagement/retention arrangement further comprising a third engagement formation, and said transmission element further comprises a retention area with a fourth engagement formation, said third engagement formation engagable with said fourth formation via a rotation of said retention element about the axis of rotation, wherein said retention element comprises a retaining-projection area, and said engagement/retention arrangement further comprises a counterretaining-projection area arranged in a fixed position relative to said engagement element for axially supporting said retaining projection area of said retention element.

11. A connecting arrangement for establishing a torque-transmitting connection between an input drive and a coupling device of a motor vehicle drive train, comprising:

a transmission element rotatable about an axis of rotation and having means for connecting said transmission element to the input drive via threaded connectors;

a first engagement formation including a first toothing formation arranged on said transmission element;

an engagement element having a second engagement formation including a second toothing formation, wherein said first and second toothing formations comprise axially projecting toothing formations relative to said axis of rotation and said first engagement formation and said second engagement formation are engagable for forming a torque transmitting connection between said transmission element and said engagement element via said first and second toothing formations; and an engagement/retention arrangement operatively arranged for maintaining the torque-transmitting connection between said transmission element and said engagement element, wherein said transmission element comprises a plurality of transmission arms which extend radially outwards from said transmission element, and wherein at least a portion of said first engagement formation is arranged on one of said plurality of transmission arms.

12. A combination comprising a coupling device of a motor vehicle drive train and a connecting arrangement for establishing a torque-transmitting connection between an input drive and the coupling device, said connecting arrangement comprising:

a transmission element rotatable about an axis of rotation and having means for connecting said transmission element to the input drive via threaded connectors;

a first engagement formation arranged on said transmission element and having a first toothing formation;

an engagement element arranged on said coupling device and having a second engagement formation with a second toothing formation, said first and second toothing formations comprise axially projecting toothing formations relative to said axis of rotation wherein said first engagement formation and said second engagement formation are engaged in a torque transmitting connection via said first and second toothing formations, and wherein at least one of said first and second toothing formations comprises a tooth having an increasing circumferential width from a radially inner side to a radially outer side of said tooth; and an engagement/retention arrangement operatively arranged for maintaining the torque-transmitting connection of said first engagement formation and said second engagement formation.

* * * * *